Jan. 16, 1962   B. H. KEATING   3,017,217
SUNSHADE SUPPORT ASSEMBLY
Filed Jan. 26, 1960

INVENTOR.
Bernard H. Keating
BY
Herbert Furman
ATTORNEY

United States Patent Office 3,017,217
Patented Jan. 16, 1962

3,017,217
SUNSHADE SUPPORT ASSEMBLY
Bernard H. Keating, Detroit, Mich., assignor to General Motors Corporation, Detroit, Mich., a corporation of Delaware
Filed Jan. 26, 1960, Ser. No. 4,657
6 Claims. (Cl. 296—97)

This invention relates to sunshade support assemblies and more particularly to vehicle body sunshade support assemblies having improved means for mounting the assemblies on vehicle bodies.

In many current production sunshade support assemblies, the assembly is provided with a mounting flange which bears against the body headlining and is secured to the body header by screws, or the like. In such assemblies, the mounting screws are visible and it is also somewhat difficult to register the screws with the openings in the body header since the body headlining overlies the header and may also be of a rigid or semi-rigid material.

The sunshade support assembly of this invention includes improved mounting means which are not visible when the assembly is mounted on the body, and which further can be universally used with flexible, rigid, or semi-rigid headlining materials. The mounting means is located within the body header and the sunshade support assembly can be easily and quickly detachably secured to the header or removed therefrom in a minimum amount of time. Further, the installation and removal of the sunshade support assembly involves no problems of registration of parts through the headlining.

The primary object of this invention is to provide a new and improved vehicle body sunshade support assembly. A further object of this invention is to provide a sunshade support assembly having improved mounting means which are not visible from view when the support assembly is mounted to a vehicle body. Another object of this invention is to provide a vehicle body sunshade support assembly having improved mounting means which allow the assembly to be easily and quickly installed on or removed from a body header and permit the assembly to be used with all types of vehicle body headlining material, whether flexible, rigid, or semi-rigid.

These and other objects of this invention will be readily apparent in the following specification and drawings wherein:

FIGURE 1 is a view of a sunshade support assembly according to this invention, in assembled position on a vehicle body header;

FIGURE 2 is an enlarged sectional view taken generally along the plane indicated by line 2—2 of FIGURE 1;

FIGURE 3 is an enlarged view taken generally along the plane indicated by line 3—3 of FIGURE 2, and FIGURE 4 is an exploded perspective view.

Referring now to the drawings, a vehicle body includes a body header 10 of the usual box cross section, the lower channel-shaped member 12 of which is provided with an enlarged circular aperture 14. Reference may be had to application Serial No. 618,323, Keating et al., filed October 25, 1956, now Patent No. 2,939,741, issued June 7, 1960, assigned to the assignee of this invention, for the details of the body header.

An anchor plate 16 is welded or otherwise secured to member 12 adjacent the aperture 14. Plate 16 includes an upwardly extending embossed barrel portion 18 having a generally flat, horizontally disposed upper wall 20 provided with an opening 22 overlying aperture 14. Opening 22 includes a central circular portion 23 and a pair of oppositely disposed locking slots 24. A pair of oppositely disposed tangs 26 are depressed out of the wall 20 intermediate slots 24, to provide locking channels 27 for a purpose to be hereinafter described. From FIGURE 3 it can be seen that the centerline of channels 27 is not located at right angles to the centerline of the locking slots 24.

An escutcheon member 30 includes a flange portion 32 which lies in a plane parallel to the plane of header member 12 and clamps the headlining 34 thereagainst. The escutcheon member further includes an upwardly extending barrel portion 36 received within portion 18 of the anchor plate and terminating in an upwardly extending apertured lug portion 37 slightly smaller than opening 22 and slidably received therewithin as shown in FIGURE 3. Lug portion 37 includes a pair of oppositely disposed, generally U-shaped wall portions 38 joined by arcuate wall portions 40. Wall portions 38 are slidably received within slots 24 of the anchor plate to thereby slidably and non-rotatably couple the escutcheon member to the anchor plate. It will be further noted that one leg of each of the wall portions 38 and approximately half of each of the wall portions 40 are vertically cut away to provide oppositely disposed slots 42. The aperture 39 defined by wall portions 38 and 40 extends through lug portion 37 and barrel portion 36 of the escutcheon member to the base wall 43 of a circular recess 44 therein.

A socket and locking member 46 includes a lower annular flange 47, a central downwardly tapering bore 48, and a pair of laterally extending lugs 50 at the upper convex-shaped end 52 thereof. Lugs 50 extend across slots 42 and are releasably received within the locking channels 27. A coil compression spring 54 seating between flange 47 of the socket member and the base wall 43 of recess 44 holds lugs 50 within locking channels 27 and also biases escutcheon member 30 upwardly into engagement with the headlining 34 to thereby slidably locate wall portions 38 within the locking slots 24.

A sunshade support arm 56 includes a semi-spherical ball portion 58 which slidably and rotatably seats within a complementary-shaped ball seat 60 at the lower end of bore 48. Arm 56 further includes a spindle 62 fitting within bore 48, the upper end 63 of which is headed over to provide a stop for a washer 64. A coil compression spring 66 fits between washer 64 and a concave-convex washer 68 which is slidably received on spindle 62 and bears against the convex upper end 52 of the socket member. Arm 56 further includes a D-shaped bore 70 which receives a complementary-shaped end of a sunshade support rod 72. The rod slidably and rotatably mounts the usual sunshade 74. One wall of bore 70 is slotted, and a bolt 76 extends between the slotted sides of the arm to clamp rod 72 in place.

The strength of spring 54 is such as to hold lugs 50 within the locking slots 27 and prevent the socket member 46 from being rotated whenever the sunshade support arm 56 is rotated about the axis of spindle 62 or is tilted as spindle 62 moves within bore 48.

When it is desired to remove the sunshade support assembly from the body header, the support arm 56 is grasped and pushed upwardly. This will move socket member 46 upwardly within recess 44 against the action of spring 54 to move lugs 50 out of the locking channels 27. Arm 56 is then rotated slightly counter-clockwise, as viewed in FIG. 3, to swing lugs 50 through slots 42 and move the upper end portion of the socket member into alignment with aperture 39, one side of each of the lugs 50 engaging the unslotted leg of one of the wall portions 38 to provide a positive stop. Thereafter, the support arm 56, socket member 46 and escutcheon member 30 are withdrawn as a unit from the body header 10 as lug portion 37 slides out of opening 22 of barrel portion 18.

From the foregoing description, it is believed to be apparent that the reverse procedure takes place when the support assembly is mounted on the body header. The escutcheon member 30 is pre-assembled to the socket member 46 by inserting the upper end of the socket member through aperture 39 until wall 43 seats on spring 54. The lug portion 37 is then inserted into opening 22. The support arm 56 is then pushed slightly upwardly and rotated to rotate socket member 46 slightly clockwise, as viewed in FIGURE 3, so that lugs 50 will swing across slots 42 and move within the locking channels 27 as arm 56 is released.

Thus, this invention provides an improved vehicle body sunshade support assembly which includes improved mounting means for mounting the assembly on a body header.

I claim:

1. In combination with a vehicle body having a body header provided with an aperture therein, a sunshade support assembly comprising, an anchor member mounted on said header and including an opening generally aligned with said aperture and having a locking slot extending therefrom, locking means on said member located adjacent said locking slot, an escutcheon member received within said aperture and opening and including a locking portion slidably received within said locking slot to slidably and non-rotatably mount said escutcheon member on said header, said escutcheon member including a bore therethrough, a rotatable socket member including a locking lug, said socket member being insertable in said bore to locate said lug in a position overlying said anchor member, said socket member being rotatable relative to said escutcheon and anchor members to locate said lug in engagement with said locking means, means on said socket member and said escutcheon member located in opposing relationship to each other, resilient means seating on said opposing means to bias said socket member and said escutcheon member oppositely with respect to each other, said resilient means biasing said escutcheon member into engagement with said header to slidably locate said locking portion within said locking slot and biasing said lug into engagement with said locking means, and a sunshade support arm mounted on said socket member.

2. In combination with a vehicle body having a body header, a sunshade support assembly comprising, an apertured anchor member mounted on said header and including a locking slot extending from the aperture therein, a locking channel on said member located adjacent said locking slot, an apertured escutcheon received within said aperture and including a locking portion slidably received within said locking slot to slidably and non-rotatably mount said escutcheon on said anchor member, a rotatable socket member including a locking lug, said socket member being insertable in said escutcheon to locate said lug in a position overlying said anchor member, said socket member being rotatable relative to said escutcheon and anchor member to locate said lug within said locking channel, means on said socket member and said escutcheon member located in opposing relationship to each other, resilient means seating on said opposing means to bias said socket member and said escutcheon member oppositely with respect to each other, said resilient means biasing said escutcheon member into engagement with said header and biasing said lug within said locking channel, and a sunshade support arm mounted on said socket member.

3. In combination with a vehicle body having a body header, a sunshade support assembly comprising, an anchor member mounted on said header and including an opening having a locking slot extending therefrom and an upwardly opening depression in said member located adjacent said locking slot, an annular escutcheon received within said opening and including a lug portion slidably received within said locking slot to slidably and non-rotatably couple said escutcheon to said anchor member, a rotatable socket member including a locking lug, said socket member being insertable through said escutcheon to locate said locking lug in a position overlying said anchor member, said socket member being rotatable relative to said escutcheon and anchor member to locate said lug within said depression, means on said socket member and said escutcheon located in opposing relationship to each other, resilient means seating on said opposing means to bias said socket member and said escutcheon oppositely with respect to each other, said resilient means biasing said escutcheon upwardly into engagement with said header to locate said lug portion within said locking slot and biasing said socket member downwardly to maintain said locking lug within said depression, and a sunshade support arm mounted on said socket member.

4. In combination with a vehicle body having a body header provided with an aperture therein, a sunshade support assembly comprising, an anchor member mounted on said header and including an opening generally aligned with said aperture and having a locking slot extending therefrom, an upwardly opening depression in said member located adjacent said locking slot, an escutcheon received within said aperture and opening and including a locking channel portion slidably received within said locking slot to slidably and non-rotatably couple said escutcheon member and said anchor member, said escutcheon member including a bore therethrough opening to said locking channel portion a rotatable socket member including a locking lug, said socket member being insertable in said bore to move said locking lug through said locking channel portion and into a position overlying said anchor member, said socket member being rotatable relative to said escutcheon and anchor member to locate said lug within said depression, flange means on said socket member and said escutcheon member located in vertically opposed relationship to each other, resilient means seating on said flange means to bias said socket member and said escutcheon member oppositely with respect to each other, said resilient means biasing said escutcheon member upwardly within said aperture into engagement with said header and biasing said socket member downwardly within said aperture to maintain said locking lug within said depression, and a sunshade support arm mounted on said socket member.

5. In combination with a vehicle body having a body header provided with an aperture therein, a sunshade support assembly comprising, an apertured anchor member mounted on said header, a hollow escutcheon member received within the apertures of said header and said member, interengaging means on said escutcheon member and said anchor member to slidably and non-rotatably couple said members, a socket member extending through said escutcheon member, interengaging locking means on said socket and anchor members to releasably mount said socket member on said anchor member, resilient means seating between said escutcheon and socket members to bias said escutcheon member and said socket member oppositely with respect to each other and bias said escutcheon member upwardly within said aperture and into engagement with said header, and a sunshade support arm mounted on said socket member.

6. In combination with a vehicle body having a body header, a sunshade support assembly comprising, an annular anchor member mounted on said header, an annular escutcheon member telescopically located with respect to said anchor member, interengaging means on said escutcheon member and anchor member to slidably and non-rotatably couple said members, a socket member extending through said escutcheon member, locking means releasably securing said socket member to said anchor member against axial movement in one direction, resilient means seating between said escutcheon and socket members to bias said socket member in said one direction, and a sunshade support arm mounted on said socket member.

References Cited in the file of this patent
UNITED STATES PATENTS

| | | |
|---|---|---|
| 2,110,120 | Ball | Mar. 8, 1938 |
| 2,190,622 | Bahr | Feb. 13, 1940 |
| 2,284,502 | Westrope | May 26, 1942 |
| 2,357,974 | Roberts | Sept. 12, 1944 |
| 2,698,728 | Heeden | Jan. 4, 1955 |
| 2,939,741 | Keating et al. | June 7, 1960 |